Aug. 19, 1969    G. GALLUS    3,461,821
APPARATUS FOR KNEADING AND SHAPING LUMPS OF DOUGH
Filed Dec. 15, 1967    2 Sheets-Sheet 1

INVENTOR
Geza Gallus
Emery G. Groff Jr.
ATTORNEY

_United States Patent Office_

3,461,821
Patented Aug. 19, 1969

3,461,821
APPARATUS FOR KNEADING AND
SHAPING LUMPS OF DOUGH
Geza Gallus, Cuba 3488, Buenos Aires, Argentina
Filed Dec. 15, 1967, Ser. No. 690,723
Int. Cl. A21c 3/00, B30b 5/00
U.S. Cl. 107—15                                5 Claims

ABSTRACT OF THE DISCLOSURE

A device for shaping lumps of dough which includes a vertically mounted plunger with a dough engaging plate at its lower end and means for reciprocating the plunger in progressive steps. The lower surface of the plate has a plurality of grooves and means is provided for rotating the plunger so that each time the grooved lower surface of the plate engages the dough, it provides a kneading action while working the dough into final product shape prior to baking.

---

This invention relates to an apparatus for forming and molding lumps of dough for use in pizza pies or other bakery products.

The primary obpect of the invention is to provide means whereby a lump of dough can be placed in an appropriate mold and then be progressively worked or kneaded by means of a reciprocating and rotatable plunger, thereby eliminating a tedious and time-consuming hand operation ordinarily followed to accomplish the same result.

Another object is to provide simple, inexpensive apparatus which is adaptable for use as a single unit where production of the particular bakery product is comparatively low, or which can be adapted to mass production techniques without sacrificing the underlying mechanical principles which permit the invention to be carried out.

Other objects of the invention will become more readily apparent in view of the following description and with reference to the accompanying drawings.

Referring to the drawings.

Figure 1:
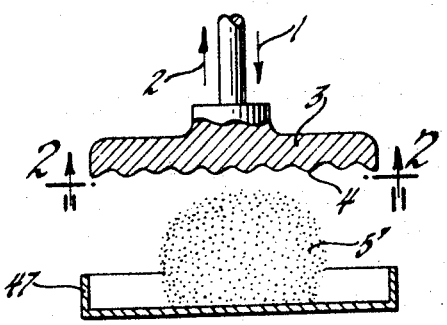
FIGURES 1, 3, 5 and 7 illustrate diagrammatically the sequential vertical positions of a plunger plate and its grooved bottom surface relative to a lump of dough from its original state to the finished product.
Figure 3:
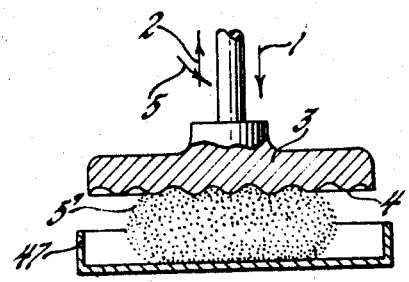
Figure 2:
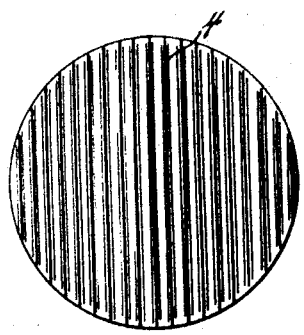
FIGURES 2, 4, 6 and 8 are diagrrammatic plan views showing the position of the grooves in the plunger plate corresponding to the positions of the plunger from a rest position shown in FIGURE 1 to the subsequent rotated positions shown in FIGURES 3, 5 and 7, respectively.
Figure 4:
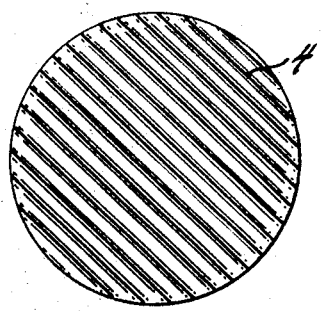

As can be seen from FIGURES 1-8, the fundamental, basic movements which are unique and essential for carrying out the objective of the invention are: the alternating, reciprocating or axial movement indicated by arrows 1 and 2, of a disc or plate member 3 provided with lower grooved surface 4, combined with a rotational movement of the plate 3 and an advance in the progressive downward movement thereof. The rotational movement of plate 3 varies the position of the grooves 4 in order to obtain a regular and uniform distribution of the lump of dough 5' in the mold 6 which is coaxially disposed in the path of the reciprocatory movement of the plate 3. Thereafter, without interruption after forming the finished product 7, the plate 3 is returned to its original position for repetition of the cycle just described to form additional finished products.

Figure 9:
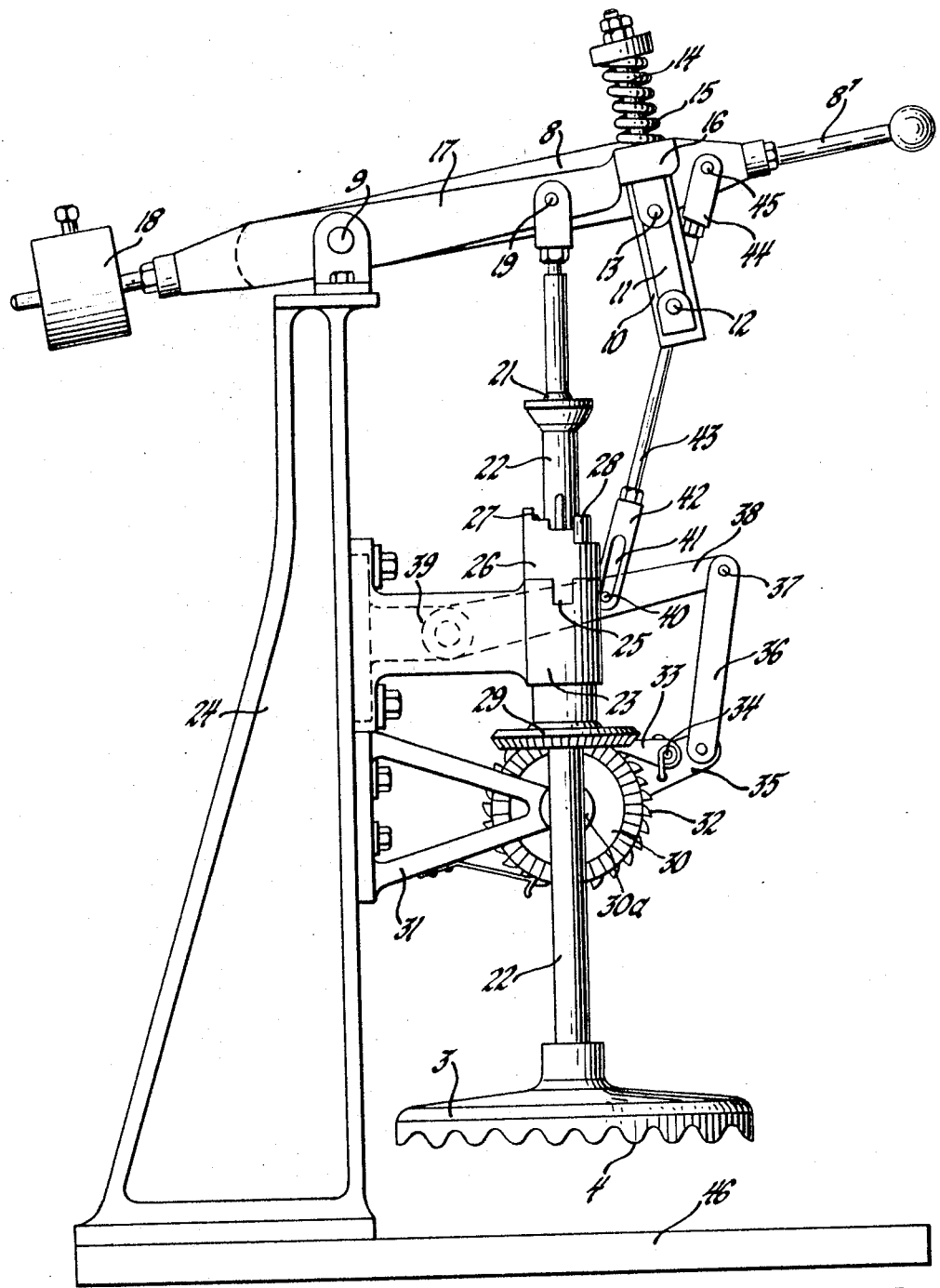
FIGURE 9 is an elevation of the complete apparatus embodying the invention.

By way of example, a preferred means of accomplishing the desired result is shown in FIGURE 9. Essentially, the reciprocating, alternating movement mentioned above is obtained by novel assembly of elements comprising a lever 8 of appropriate form and dimensions, pivoted at the fulcrum 9 at the top of a vertical support member 24. An arm 10 extends downwardly from lever 8 and supports a connecting link 11, pivoted at 12, to the lower end of the arm 10 and pivoted at 13 to a spindle 14 which, by means of a spring 15, is connected to arm 16 integral with a second lever 17. The lever 17 is pivoted at the same fulcrum 9 as the lever 8 and is provided at its opposite end with a counterweight 18. At a point 19 on the lever 17 a spindle 20 is pivoted and is provided with a swivel or ball joint 21 at its lower end connected with the upper end of a plunger shaft 22. The shaft 22 is guided in an arm 23, solid with the vertical support member 24. A cylindrical member or sleeve 26 is keyed to arm 23 by means of a tooth 25. The upper portion of sleeve 26 is provided with a series of steps 27, which function as an annular track on which a lug 28, projecting from the shaft 22, can slide. Connected to the said shaft 22 which is axially slidable is a bevel gear 29 which meshes with its reciprocal bevel gear 30, mounted on a transverse axle 30a secured to lateral supports 31 which are fixed at their bases to the column 24. On the axle 30a and solid with the gear 30 is a ratchet gear 32 engaged by a pawl 33 which is pivoted on a stud 34 projecting from a crank 35. Said crank 35 oscillates on the same axle 30a as the gears 30 and 32 and is connected with a connecting link 36 pivoted at 37 to another crank 38. The crank 38 is pivotally secured to a support 39, shown in dotted lines, and is connected to the lever 8 by means of a laterally projecting stud 40 slidable in a slot 41 in yoke 42 secured to the lower end of a rod 43. The stud 40 and slot 41 provide a lost motion effect in connection with the coordinated reciprocation and rotation of shaft 22. The upper end of rod 43 has another yoke 44 secured thereto which is pivoted at 45 to lever 8. The shaft 22 extends downwardly below the gear 29 and the plate 3 is secured to the lower end of the shaft. The plate 3 is normally spaced from the base or bed 46 which supports the mold in the form of a pan 47 which provides the peripheral configuration of the lump of dough in its final shape and form.

Figure 7:
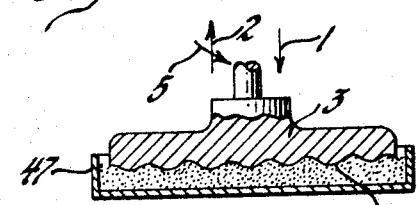
Figure 5:
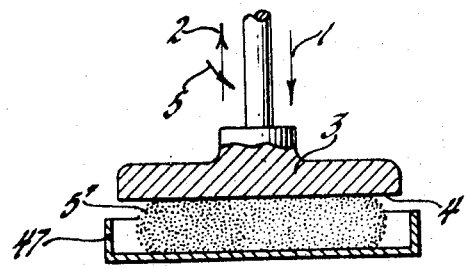
Figure 8:
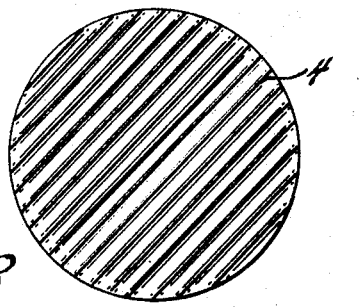
Figure 6:
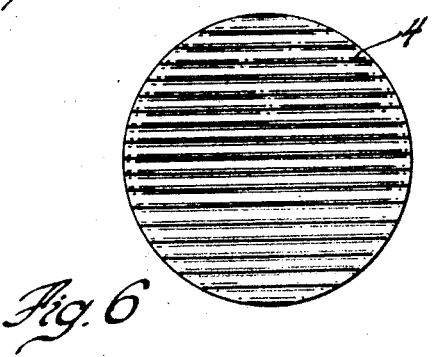

In operation of the apparatus, the lump of dough 5' is placed in the pan 47 and centered beneath plate 3. The handle 8' of lever 8 is moved downwardly, causing shaft 22 to slide downwardly as shown by the arrow 1 in FIGURE 1 under the impulse of the arm 10 connected to lever 8 and through the connecting link 11. The connecting link 11 urges the spring 15 downwardly and in turn moves lever 17 downwardly through connection with link 11, pivot 13, spindle 14 and arm 16. Simultaneous with the aforesaid operation, rod 43 moves downwardly, causing crank 38 to pivot downwardly, thus actuating link 36 and crank 35, which causes pawl 33 to slide over the teeth of the gear 32. Until the lever 8 rises under action of counterweight 18 when pressure on handle 8' is released, the pawl 33 will remain immobile, while the shaft 22 moves upwardly as indicated by arrow 2 in FIGURE 1, and the lug 28 moves away from the steps 27 of sleeve 26. The pawl 33 then rotates the ratchet gear 32 and its coaxial gear 30, which causes gear 29 to rotate and with it the shaft 22 will rotate a fraction equal to one of the steps 27, which movement is shown by the arrow 5 in FIGURE 3. In the succeeding operation, shaft 22 and plate 3 will descend a fraction more than in the previous operation and produce a greater flattening and distribution of the dough 5', as shown in FIGURE 5, until the number of operations equal the number of steps 27, thus compacting the lump 5' into the finished product 7 with the desired thickness and dimensions as shown in FIGURE 7.

Although a single unit has been described above, it is within the concept of my invention to utilize the basic mechanism providing the reciprocating and rotational movement of the plunger shaft in situations where a series of similar units may be aligned and operated in unison by appropriate mechanism connected, for example, to handles 8′. In such a mass production situation, conveyor means for supporting the molds or pans could be provided and also apparatus for automatically filling the molds or pans could be included in accordance with known techniques and procedures.

I claim:
1. Apparatus for progressively kneading and shaping lumps of dough comprising in combination,
a vertical support member,
a first and second lever each pivotally connected to the upper portion of said support,
means normally urging said levers to a rest position,
means connecting said first and second levers to each other,
a shaft rotatably connected at its upper end to said first lever, a dough kneading and shaping member at the lower end of said shaft,
guide means for said shaft secured to said support, said shaft slidable in said guide means,
stepped track means connected to said guide means,
means on said shaft engaging said stepped track means for controlling the progressive descent of said shaft, and
means connected with said second lever and said shaft for rotating said shaft during its upward movement an amount equal to one step of said stepped means.

2. Apparatus according to claim 1, wherein the means connecting said first and second levers includes an arm secured to said second lever, a link connected to the lower end of said arm and also connected to said first lever.

3. Apparatus according to claim 1, wherein the lower surface of said dough kneading and shaping member is provided with a plurality of grooves.

4. Apparatus according to claim 1, wherein said stepped track means comprises a sleeve including a plurality of steps in the upper edge thereof and the means on said shaft engaging said steps is a lug.

5. Apparatus according to claim 4, wherein the means connecting the second lever with said shaft includes a gear integral with said shaft, a second gear mounted on said support and meshed with said first mentioned gear, a ratchet integral with said second gear, link and lever means including lost motion means connected with said second lever, and a pawl mounted on one of said links and engageable with said ratchet.

References Cited

UNITED STATES PATENTS 1,937,290  11/1933  Mears.

FOREIGN PATENTS 1,021,321  12/1952  France.
194,169  3/1923  Great Britain.

EDWARD L. ROBERTS, Primary Examiner

U.S. Cl. X.R.

100—238